Figure 1:
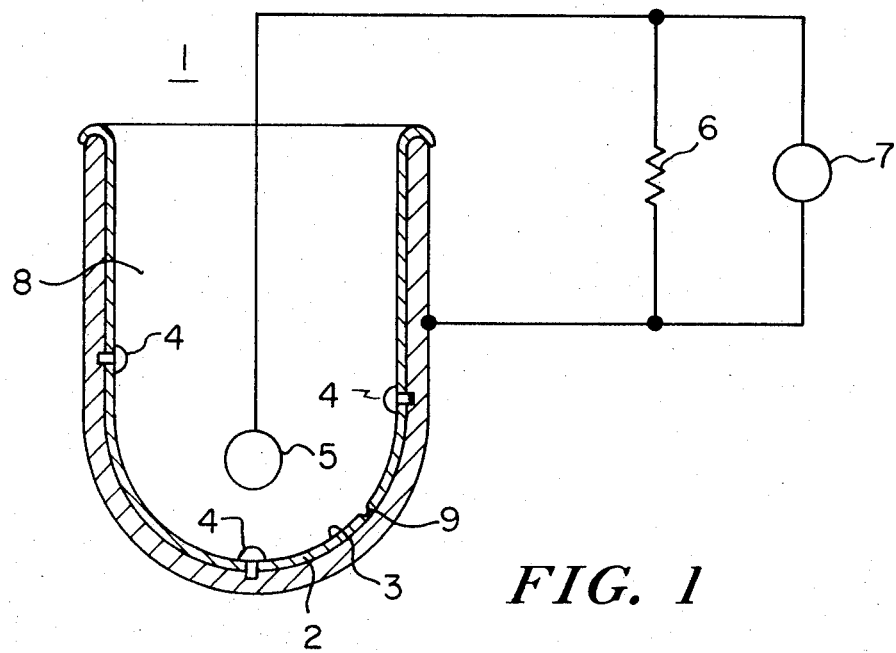

United States Patent
Voellmin et al.

[11] 3,858,114
[45] Dec. 31, 1974

[54] METHOD AND APPARATUS FOR THE TESTING OF PROTECTIVE LININGS

[75] Inventors: Siegfried Voellmin, Ormalingen, Switzerland; Klaus Müller, Rheinfelden, Germany

[73] Assignee: F. Hoffmann-LaRoche & Co., Basel, Switzerland

[22] Filed: Nov. 12, 1973

[21] Appl. No.: 415,069

[30] Foreign Application Priority Data
Nov. 15, 1972    Switzerland................... 16604/72

[52] U.S. Cl.................................. 324/54, 324/29
[51] Int. Cl...................... G01r 31/12, G01n 27/20
[58] Field of Search............ 324/54, 29, 30; 204/1 T

[56]                References Cited
                UNITED STATES PATENTS
2,497,052    2/1950    Williams......................... 324/30 X
3,259,840    7/1966    Schascl et al.................... 324/29
3,551,801    12/1970   Wood et al....................... 324/29
3,555,414    1/1971    Deichelmann..................... 324/54
3,719,884    3/1973    LaRoche.......................... 324/54

FOREIGN PATENTS OR APPLICATIONS
1,912,697    10/1964   Germany........................ 324/54

*Primary Examiner*—Gerard R. Strecker
*Attorney, Agent, or Firm*—Samuel L. Welt; Jon S. Saxe; George M. Gould

[57]            ABSTRACT

A method for detecting faults in reaction vessel linings is disclosed. The method involves disposing a platinum electrode in a conductive medium in the vessel and measuring any current flowing from the electrode to the metal wall of the reaction vessel. On damage occurring to the lining, the current flowing increases accordingly. An apparatus for carrying out the method of the invention is also disclosed.

8 Claims, 3 Drawing Figures

3,858,114

METHOD AND APPARATUS FOR THE TESTING OF PROTECTIVE LININGS

BACKGROUND OF THE INVENTION

This invention relates to a method and apparatus for the testing of protective linings and in particular a method and apparatus for the electrical detection of damage to an anti-corrosive protective lining on the steel wall of a reaction vessel.

It is common practice to use protective layers such as enamel layers as an anti-corrosive lining on the inside of reaction vessels when operating with corrosive liquids in a chemical works. In such apparatus even the smallest undetected fault in the protective lining can result in such corrosion of the vessel as to render it unusable and irreparable. These protective linings must thus be continuously checked so that faults are immediately detected.

Methods which have previously been used for the detection of such faults have been based on the measurement of an electrical resistance between an electrode and the wall of the reaction vessel.

In a reaction vessel having a protective layer, such as an enamel layer, which has already been repaired several times using tantalum plugs and which cannot be masked with an insulating layer (e.g., owing to the nature of the medium in the vessel) the measurement of the resistance is useless, since in this case it is impossible to distinguish between the tantalum plugs and faults in the protective layer.

It is an object of the present invention to overcome the foregoing disadvantages.

DESCRIPTION OF THE INVENTION

According to the present invention the disadvantages mentioned above are overcome by measuring the current flowing between a platinum electrode in an electrically conductive medium in the reaction vessel and the exposed steel surface at a fault in the protective layer, whereby the platinum electrode and the steel surface exposed form a Pt-Fe cell.

The present invention also provides an apparatus for carrying out the method according to the invention which comprises a platinum electrode disposed inside the reaction vessel and electrically insulated therefrom, so that, when the non-conductive protective layer is damaged and when there is an electrolyte present in the apparatus, a Pt-Fe cell is formed between said electrode and the exposed steel surface, a low value measuring resistance forming the external connection between the platinum electrode and the steel wall of the apparatus and a meter for the determination and indication of the voltage drop across the measuring resistance, whereby the magnitude of the voltage drop, which is determined by the intensity of the current delivered by the Pt-Fe cell, indicates the degree of damage to the protective layer.

Figure 2:
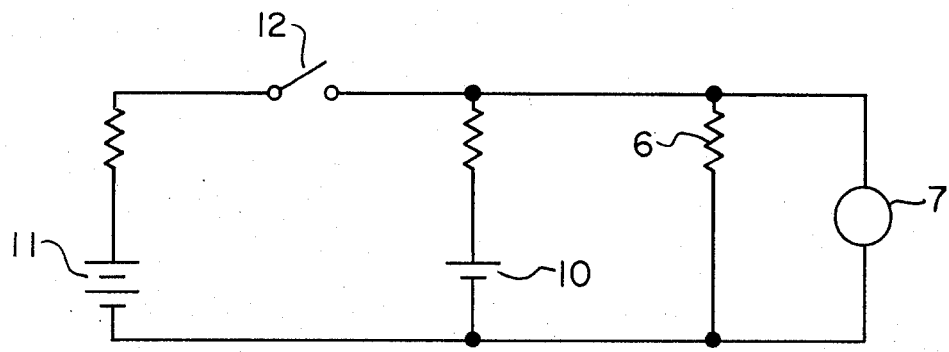
Figure 3:
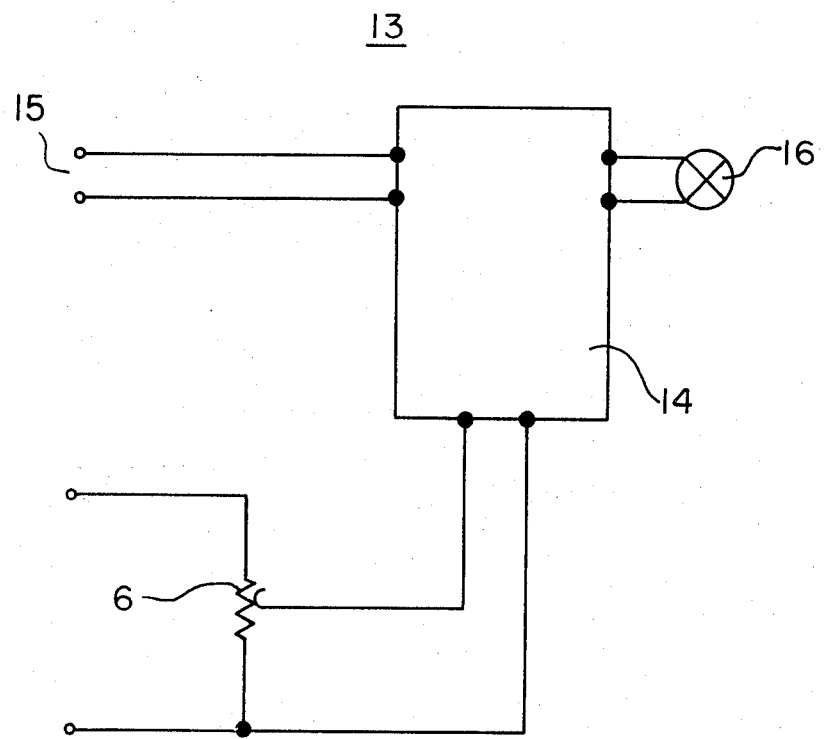

One preferred embodiment of the present invention will now be described with reference to the accompanying drawings in which, FIG. 1 shows an apparatus according to the invention for the continuous surveillance of an enamel layer, FIG. 2 shows an equivalent circuit diagram for the monitoring apparatus wherein the fault in the reaction vessel is represented by a Pt-Fe cell, and FIG. 3 shows, in block form, the arrangement of the indicator of an industrial monitoring system with a 50 mV potentiometer voltage recorder with mains connection and alarm contacts, an alarm lamp and a resistance of 100 ohms with leads for callibration when the apparatus is put into service.

Referring to FIG. 1, the apparatus 1 shown schematically in cross section has a steel wall 2, the inside surface of which is coated with an enamel layer 3. At various points in the enamel layer where damage has already occured are so-called tantalum-plugs 4 which have been used to repair the damage. A platinum electrode 5, which is electrically insulated from the apparatus, is disposed inside the apparatus. The platinum electrode is connected to the wall 2 of the apparatus via a 100 ohm measuring resistance 6 which lies outside the apparatus. A millivoltmeter and/or indicator device 7 is connected in parallel with the resistance.

When a fault occurs in the enamel layer and when there is an electrically conductive medium 8 in the apparatus, a Pt-Fe cell is formed between the platinum electrode 5 and the exposed steel surface 9. The current delivered by this cell then flows through the measuring resistance 6. This current which is measured using the millivoltmeter 7 by measurement of the voltage drop across the measuring resistance 6, is an indication of the rate at which iron is going into solution and thus the extent of the damage to the enamel layer.

The criteria to choose a suitable value for the measuring resistance 6 are given in a first approach by the measuring principle described below and more precisely by the requirement that the signal-to-noise ratio of the measurement be as high as possible, so that fault indicating readings can be clearly distinguished from noise.

The measuring principle will now be explained with reference to the equivalent circuit diagram shown in FIG. 2. A first voltage generator 10 and its source impedance represent the Pt-Ta cell which may arise between the platinum electrode and the tantalum repair elements 4 in the situation where there is no complete insulating covering on these repair elements. A second voltage generator 11 and its source impedance represent the Pt-Fe cell, which is formed, as soon as a fault occurs in the enamel layer, between the platinum electrode and the exposed steel surface 9. A switch 12 enables the good or damaged state of the enamel layer to be represented. The measuring resistance 6 and the millivoltmeter and/or indicator device 7 serve to measure the current. When the switch 12 is in the open position, then the reading corresponds to that of the enamel layer being in good condition, that is, the Pt-Fe cell 11 is not supplying any power and only the Pt-Ta cell and possible other disturbing influences are providing a potential, which however on loading with a 100 ohm measuring resistance breaks down, as the resulting source impedance of the Pt-Ta cell and occassional noise source is much higher than the measuring resistance. When the switch 12 is closed, the situation corresponds to a damaged enamel layer. The Pt-Fe cell is present and there is a marked increase in the voltage measured, since the source impedance of the Pt-Fe-cell is lower than the measuring resistance, so that in the case of the Pt-Fe cell — in contrast to the Pt-Ta cell and the interfering sources — the driving potential does not break down when loaded with a low resistance.

Hence, it follows, that the chosen measuring resistance should be much lower than the source impedance of the Pt-Ta cell and noise sources and higher than the source impedance of the Pt-Fe-cell. The optimal value of the measuring resistance should be determined according to the conductivity of the electrolyte used. For this purpose a fault of the protective layer is simulated by immersing an iron bar in the electrolyte, whereupon by means of a variable resistor the optimal value of the measuring resistance is determined, with which the highest signal-to-noise ratio can be attained. The optimum value of 100 ohms given above for the measuring resistance was determined in actual use with hydrobromic acid as electrolyte (40% hydrobromic acid and 60% water, weight percentages, at 95°C).

Tests in actual use have shown that when measurement of current, as described above, is effected, a signal-to-noise ratio of the parameters measured of about 5.8 is obtained as between undamaged and damaged protective linings. One thus gets a clear indication as to when there is a fault in the protective layer. Since the change in the parameter when damage occurs is big enough, the measurement of current may conveniently be used for the continuous surveillance of protective layers in use. The immediate indication renders possible the taking of early appropriate steps.

According to one preferred embodiment of the invention which is shown in FIG. 3 of the accompanying drawings, the indicator 13 used is a 50 mV potentiometer voltage recorder 14 having a mains connection 15, whereby it is possible to obtain a permanent record of the state of the protective layer. An alarm 16 is set off as soon as a certain predetermined threshold value is exceeded. In order to calibrate the indicator 13 and to set the minimum value at which the alarm should operate, it is necessary to simulate a defective protective layer, when the apparatus is brought into use, using an iron bar. This bar is immersed in the reaction vessel and the deflection of the recorder is set to 80%, the minimum value at which the alarm should operate being set at 50%.

In addition, it is in some applications convenient to integrate the measured voltage, to get a measure of the a amount of iron which is gone into solution due to a defective protective layer. This integration can be carried out by an integrating circuit connected to or incorporated in the millivoltmeter 7.

Experience with the method and apparatus of the invention has shown that the platinum electrode should be disposed as low down in the apparatus as possible, so that the protective layer can be supervised even where the level of liquid in the reaction vessel is low. Furthermore the electrode must be so constructed that the hydrogen which is formed on the platinum can easily escape upwards and does not first accumulate in pockets. The platinum electrode is preferably mounted on a baffle or thermometer tube. The leads to the electrode are conveniently embedded in enamel. A further possibility is to mount a platinum electrode screw in the exit vent. The electrode is electrically insulated from the vent shaft and the lead may conveniently pass down the vent shaft. When installing the equipment, it is important that all metal parts which are to be supervised are electrically connected to the wall of the reaction vessel.

We claim:

1. A method for the detection of damage to a nonconductive protective layer on the steel wall of a reaction vessel said protective layer being interspersed with one or more tantalum repair plugs, which comprises measuring a current flowing between a platinum electrode in an electrically conductive corrosive medium in the reaction vessel and the exposed steel surface at a damaged point of the protective layer, whereby the platinum electrode and the exposed steel surface form a Pt-Fe cell.

2. A method as claimed in claim 1, including integration of a circuit parameter, which is proportional to the value of the measured current.

3. A method as claimed in claim 1 wherein an alarm system is included which is actuated when the current flowing exceeds a predetermined threshold value.

4. An apparatus for the detection of damage to a nonconductive protective layer on the steel wall of a reaction vessel said protective layer being interspersed with one or more tantalum repair plugs comprising a platinum electrode disposed inside the reaction vessel and electrically insulated therefrom, so that, when the nonconductive protective layer is damaged and when there is a corrosive electrolyte present in the apparatus, a Pt-Fe cell is formed between said electrode and the exposed steel surface, a low value measuring resistance forming the external connection between the platinum electrode and the steel wall of the apparatus and a meter for the determination and indication of the voltage drop across the measuring resistance, whereby the magnitude of the voltage drop, which is determined by the intensity of the current delivered by the Pt-Fe cell, indicates the degree of damage to the protective layer.

5. The apparatus of claim 4, wherein the value of the measuring resistance used is selected in order to attain an optimum signal-to-noise ratio in the measurement.

6. The apparatus of claim 4, wherein the measuring resistance has a value of about 100 ohms.

7. The apparatus of claim 4, wherein the circuit is adapted to trip an alarm system when the current flowing exceeds a predetermined threshold value.

8. The apparatus of claim 4, including an integrating circuit for integration of the measured voltage.

* * * * *